United States Patent [19]

Lenherr et al.

[11] Patent Number: 4,609,095
[45] Date of Patent: Sep. 2, 1986

[54] ARTICLE SPACING APPARATUS

[75] Inventors: Harald Lenherr; Gert Deutschländer, both of Neuhausen am Rheinfall, Switzerland

[73] Assignee: SIG Schweizerische Industrie-Gesellschaft, Neuhausen am Rheinfall, Switzerland

[21] Appl. No.: 597,018

[22] Filed: Apr. 5, 1984

[30] Foreign Application Priority Data

Apr. 5, 1983 [CH] Switzerland ............... 1831/83

[51] Int. Cl.⁴ ............................................. B65G 47/26
[52] U.S. Cl. ..................................... 198/460; 198/462
[58] Field of Search ........................ 198/460, 462, 459

[56] References Cited

U.S. PATENT DOCUMENTS 3,162,294 12/1964 Dieter ................................. 198/460
3,335,841 8/1967 Klingel et al. ..................... 198/460

FOREIGN PATENT DOCUMENTS 1288509 9/1969 Fed. Rep. of Germany .
540180 9/1973 Switzerland .
889419 2/1962 United Kingdom ............... 198/460

Primary Examiner—Joseph E. Valenza
Assistant Examiner—Kyle E. Shane
Attorney, Agent, or Firm—Spencer & Frank

[57] ABSTRACT

An apparatus for providing a uniform spacing between articles supported on and advanced by a conveyor in a conveying direction, comprises a carrier arranged for travel in the conveying direction at a speed less than that of the conveyor and a plurality of spacer units mounted uniformly spaced on the carrier. Each spacer unit includes a spacer gate having a working position in which the spacer gate is abutted by an article advanced by the conveyor and an idling position in which articles advanced by the conveyor pass by the spacer gate unhindered. Each spacer unit further has a sensor element supported upstream of the spacer gate and is displaceable by an article before the article abuts said spacer gate; and actuating mechanism operatively coupled to the sensor element and to the spacer gate which belongs to an immediately upstream located spacer unit for moving the last-named spacer gate from the idling position to the working position in response to a displacement of the sensor element by the article.

14 Claims, 6 Drawing Figures

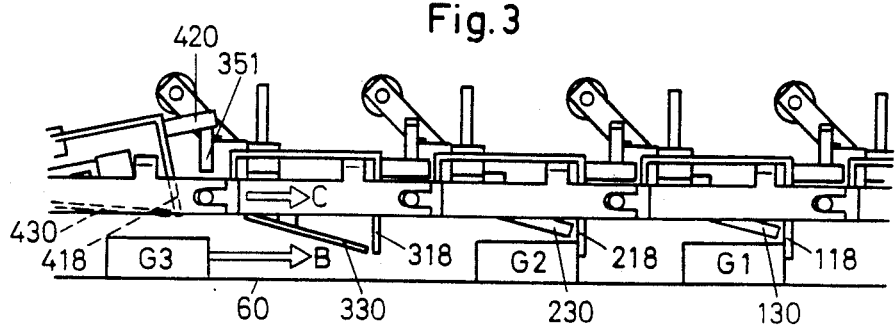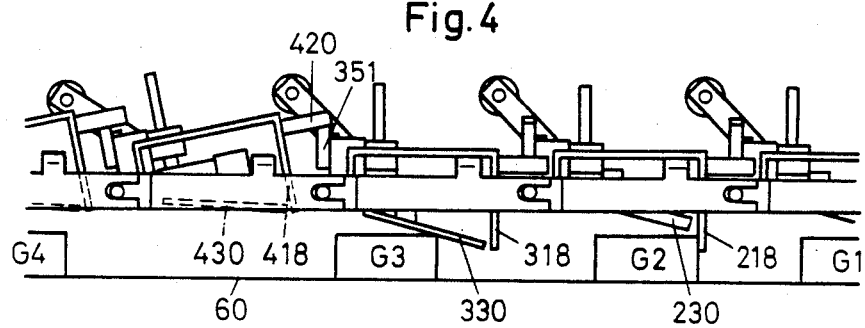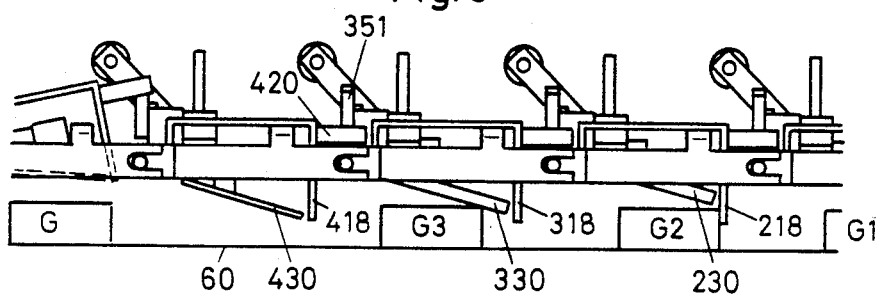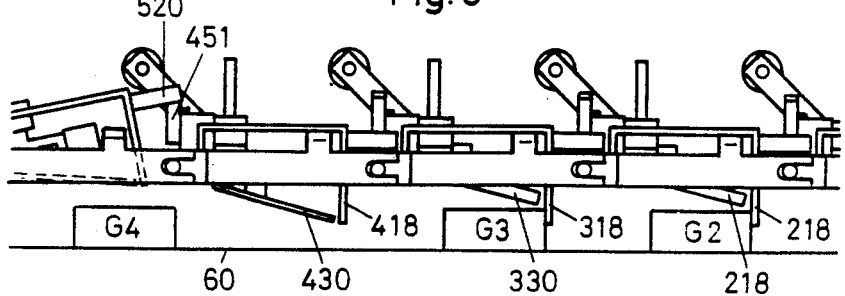

4,609,095

ARTICLE SPACING APPARATUS

BACKGROUND OF THE INVENTION

This invention relates to an apparatus for providing a uniform spacing between articles which are advanced on a conveyor in a randomly spaced series. The apparatus has spacer gates which are adapted to engage each article advanced on the conveyor and which are moved parallel to the conveyor surface codirectionally with the direction of article advance, With a speed that is less than the conveying speed. The spacer gates are movable between an inoperative position in which the articles may be advanced unhindered and a working position in which the articles abut against the spacer gates. The apparatus further includes an actuator for shifting the spacer gates from the inoperative position into the working position.

An apparatus for organizing articles on a conveyor such that a uniform spacing is provided therebetween is needed particularly in the packaging industry to ensure that randomly supplied articles will not cause a crowding or pile-up to thus avoid damage to the articles or other operational disturbances.

German Pat. No. 1,288,509 discloses an apparatus which uniformly spaces articles supplied in a random spacing on a conveyor. For this purpose, above a conveyor belt spacer gates are arranged which are shiftable between inoperative (idling) and working positions. In the idling position the spacer gates clear the articles without contacting the same, while in the working position they extend into the travelling path of the articles. If the conveying speed of the articles on the conveyor belt is greater than that of the spacer gates, the articles abut the spacer gates if the latter are in their working position and thus assume the same spacing as the spacer gates. It is of importance that the articles are monitored and each time when an article abuts the respective leading spacer gate, the successive spacer gate is brought into the working position. Externally of the conveyor zone all spacer gates must be brought into their idling position.

For moving the spacer gates into their working position, the frictional force between each article and the conveyor belt is utilized, as the articles, because of their higher speed, abut against the respective spacer gates. As a result, the abutted spacer gate executes a pivotal motion which causes a pawl to be rotated to thus release a ratchet which holds the successive spacer gates. The latter then drops into the working position by its own weight. Conversely, pusher rods and the pawls are guided on a rail for moving, partially by gravity, the spacer gates, the push rod and the pawls into the idling position. The frictional force between the articles and the conveyor belt, however, may be utilized for the above purpose only if the artices are relatively heavy. Lightweight articles, articles of different sizes or of non-uniform weight may not be uniformly spaced with such a prior art arrangement. Further, the utilization of gravity as a moving force results in a sluggish switching into the working position; this limits the output of the apparatus.

SUMMARY OF THE INVENTION

It is an object of the invention to provide an improved apparatus of the above-outlined type which functions in an operationally safe manner with high output and with which articles of substantially different shapes, weights and sizes may be handled in a gentle manner when brought into uniform spacings by spacer gates.

This object and others to become apparent as the specification progresses, are accomplished by the invention, according to which, briefly stated, a plurality of spacer units are mounted on a spacer unit carrier at a distance from one another. Each spacer unit includes a spacer gate having a working position in which the spacer gate is abutted by an article advanced by the conveyor and an idling position in which articles advanced by the conveyor pass by the spacer gate unhindered. Each spacer unit further has a sensor element supported upstream of the spacer gate and is displaceable by an article before the article abuts the spacer gate; and an actuating mechanism operatively coupled to the sensor element and to the spacer gate which belongs to an immediately upstream located spacer unit for moving the last-named spacer gate from the idling position to the working position in response to a displacement of the sensor element by the article.

BRIEF DESCRIPTION OF THE DRAWINGS

FIGS. 3, 4, 5 and 6 are schematic side elevational views of the preferred embodiment, depicting different operational positions.

DESCRIPTION OF THE PREFERRED EMBODIMENT

Figure 2:
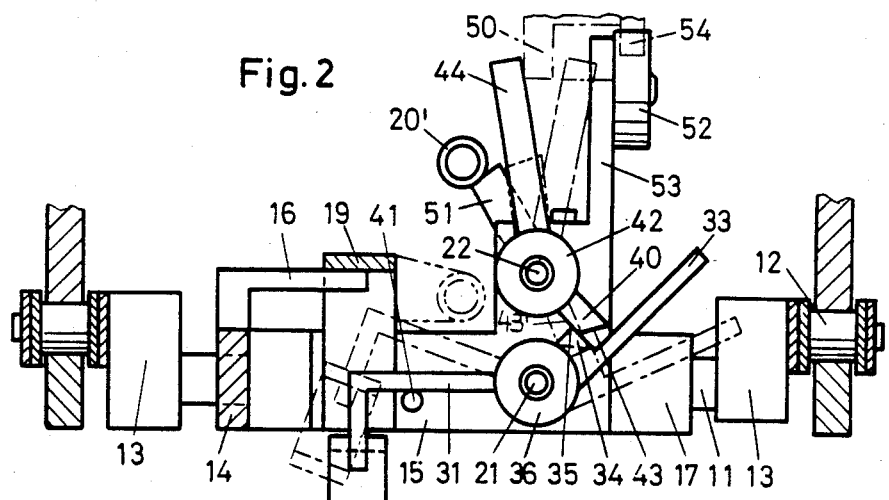
FIG. 2 is a sectional view taken along line II—II of FIG. 1.
Figure 1:
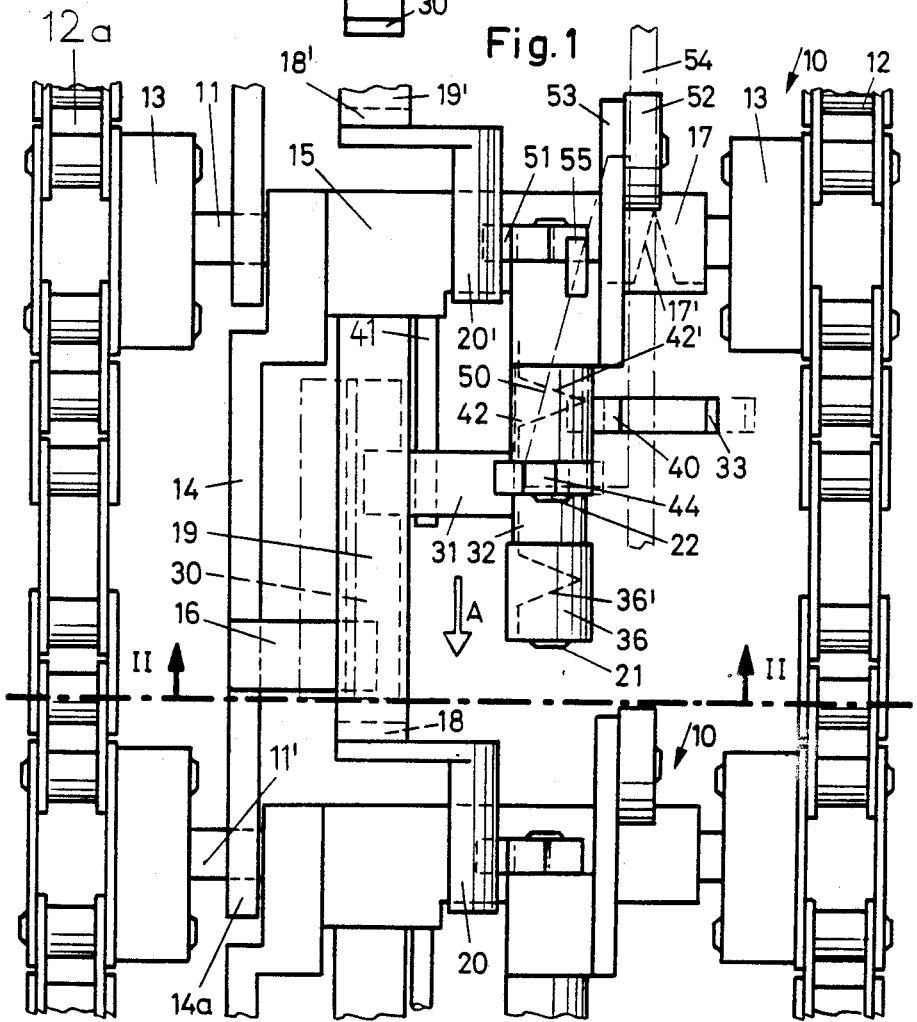
FIG. 1 is a top plan view of a preferred embodiment of the invention.

Turning now to FIGS. 1 and 2, there is shown an endless carrier chain 12a, 12b on which, at predetermined uniform distances, spacer units generally designated at 10 are mounted. Each spacer unit 10 has a transverse pivot bar 11 attached at opposite ends to support blocks 13 which, in turn, are mounted on the parallel-spaced chain parts 12a and 12b. Each bar 11 rotatably supports a connecting element 14 and a carrier element 15. The connecting element 14 carries, in the vicinity of its free end 14a (which rests on the immediately downstream arranged pivot bar 11') a support bar 16, by means of which the carrier element 15 which is biased clockwise (as viewed in a left-hand end view) by a spring 17' arranged in a sleeve 17, is supported in the working position by providing a backup support for a spacer gate 18. The latter is supported on the carrier element 15 by means of a carrier bar 19 such that the spacer gate 18 is situated downstream of the carrier element 15 as viewed in the direction of advance of the carrier chain 12a, 12b as indicated by the arrow A. To the carrier bar 19 there is rigidly affixed a support tube 20 by means of which—as will be described in further detail later—the spacer gate 18 is maintained in its idling position.

On the carrier element 15 there are mounted two superposed pivot shafts 21 and 22 which are oriented perpendicularly to the pivot bar 11 and parallel to the carrier bar 19. While the upper pivot shaft 22 is rotatably supported, the lower pivot shaft 21 serves as a bearing for a hub 32 rotatably mounted thereon. A sensor element (sensor bar) 30 is affixed to the hub 32 by a lever arm 31 such that the sensor bar 30 is positioned underneath the carrier bar 19 and effects, with a relatively large stroke as it is being lifted by an article in a manner described later, a small-angle rotation of the hub 32. The sensor bar 30 extends in the conveying direction A and forms an acute angle of between 5° and 30° with the conveyor surface 60 as shown in FIGS. 3–6. To the hub 32, approximately diametrically from the lever arm 31, there is further affixed a catcher bar 33. The catcher bar 33 has a catcher lug 34 provided with a catcher edge 35. On the shaft 22 there is rotatably mounted a housing 42 to the outside of which a radially outwardly projecting detent tab 40 is affixed. The detent tab 40 has a detent edge 43' which cooperates with the catcher edge 35 for maintaining the sensor element 30 in its working position, shown in solid lines in FIG. 2.

As it may be observed in FIG. 2, a slight lifting of the sensor bar 30 by an article from its solid-line position towards its phantom-line position results in a clockwise pivotal motion of the catcher lug 34, whereby its catcher edge 35 slides past the detent edge 43' of the detent tab 40 in a clockwise direction. By means of a spring 36' accommodated in a housing 36 mounted concentrically with the hub 32, the latter is biased in a counterclockwise direction and thus the lever arm 31 is urged against a stop pin 41 affixed to the carrier element 15. A further spring 42' positioned in the housing 42 biases the latter and the pivot shaft 22 in a clockwise direction to urge a propping tab 51, affixed to the shaft 22, against a support bar 55. After the catcher edge 35 clears the detent edge 43' (in response to an upward displacement of the sensor bar 30 by an article), the detent tab 40, urged by the spring 42', presses with an oblique camming edge 43 against the catcher edge 35 and thus the force of the spring 36' accommodated in the housing 36 is overcome and the sensor element 30 is abruptly lifted into its terminal idling position shown in broken lines in FIG. 2.

To the housing 42 there is attached a setting arm 44 which, in response to a leftward force exerted thereon for resetting the sensor bar 30 into its working position, moves from its phantom-line position into its solid-line position, thus turning the housing 42 counterclockwise. The camming edge 43 of the detent tab 40 which moves with the housing 42 as a unit, releases the catcher edge 35 and thus the sensor element 30 is rotated by the spring 36' accommodated in the housing 36 in a counterclockwise direction, from its broken-line position into the solid-line position and thus assumes its working position in abutment against the stop pin 41. Assuming an advance in the direction indicated by the arrow A (FIG. 1), the displacement of the setting arm 44 may be effected by a camming rail 50 cooperating with the setting arm 44 at the end of the article conveyor.

The propping tab 51 serves to prop up the support tube 20' of the immediately upstream-located spacer unit for maintaining the associated spacer gate 18' in the idling position. In order to allow the support tube 20' to be raised to thus displace the spacer gate 18' from the working position to the idling position at the end of the article conveyor, a follower roller 52 is mounted on the carrier element 15 by means of an arm 53. An additional camming rail 54 serves for pressing down the follower roller 52, whereby the carrier element 15 is rotated counterclockwise about the pivot bar 11 when viewing the structure shown in FIGS. 1 or 2 from the left. If thus first the carrier element 15 is rotated as a result of the cooperation between the camming rail 54 and the follower roller 52 and thereafter, the setting arm 44 is pressed towards the left by the camming rail 50, the propping tab 51 moves underneath the support tube 20', whereupon the spacer gate 18' and the sensor element 30 assume their idling position.

In the description which follows, the operation of the above-described apparatus will be set forth with reference to FIGS. 3 through 6.

In FIGS. 3–6, in order to differentiate from one another like components belonging to different spacer units 10, the reference numerals used in FIGS. 1 and 2 are preceded by a series number 1, 2, 3 or 4, dependent upon whether the component forms part of the first, second, third or fourth spacer unit as viewed from the right towards the left in FIGS. 3 to 6.

FIG. 3 illustrates two articles G1 and G2 on the conveyor belt 60, in engagement with respective spacer gates 118 and 218 which are in the working position. The conveyor belt 60 moves with a first velocity towards the right in the direction of arrow B, while the spacer chain 12a, 12b situated above the conveyor 60 moves in the same direction as, but with a lesser speed than, the conveyor belt 60. The speed of the spacer chain may be, for example, one half that of the conveyor 60. The direction of movement of the spacer chain is indicated by the arrow C. This speed relationship ensures that the articles G1 and G2 are maintained in firm engagement with the spacer gates 118 and 218. The sensor bars 130 and 230 associated, respectively, with the spacer gates 118 and 218 are in the idling position. In the spacer unit immediately upstream of that containing the spacer gate 218, both the spacer gate 318 and the sensor bar 330 are in their working position. The propping tab 351 holds the support tube 420 forming part of the immediately upstream spacer unit in the raised position. As a result, the spacer gate 418 and the sensor 430 of the last-named spacer unit are in the idling position.

As the article G3 catches up with the sensor bar 330, the article G3 contacts and then lifts the sensor bar 330, as shown in FIG. 4. Also referring to FIG. 2, as soon as the catcher edge 35 slides underneath the detent tab 40, the sensor bar 330 is abruptly moved upwardly as described in detail earlier and the propping tab 351 releases the support tube 420, whereupon the spacer gate 418 and the sensor bar 430 assume their working position as illustrated in FIG. 5. While the sensor bar 330 is not yet entirely in its idling position, it is, as described earlier in connection with FIG. 2, after having been lifted by the article, rotated further in the same sense, so that it moves clear of the article G3 and thus allows the latter to be advanced against the spacer gate 318.

FIG. 6 depicts the situation when the article G3 has abutted the spacer gate 318 and thus assumes a distance from the article G2 which is identical to that between the articles G2 and G1 (FIG. 3) set previously by the spacer gates 118 and 218.

The apparatus acccording to the invention eliminates the necessity of providing an article accumulation before the articles can be uniformly spaced, as it is the case in the apparatus disclosed in Swiss Pat. No. 540,180. Thus, according to the invention, damaging of the articles by rubbing against one another is avoided. By separating each spacer gate and sensor element into two separately operating lever-like parts, particularly the sensor element may be actuated by a wide variety of articles, as regards their size, weight and shape. By virtue of the use of springs, slight forces suffice to cause activating of the sensor elements and spacer gates and such activation occurs rapidly. By means of the spring-biased catcher edges and detent tabs the components may be maintained jar-safe in the idling position.

It will be understood that the above description of the present invention is susceptible to various modifications, changes and adaptations, and the same are intended to be comprehended within the meaning and range of equivalents of the appended claims.

What is claimed is:

1. An apparatus for providing a uniform spacing between articles supported on and advanced by a conveyor in a conveying direction, comprising:
   (a) a carrier means arranged for travel in said conveying direction parallel to said conveyor at a speed less than that of said conveyor;
   (b) a plurality of spacer units mounted on said carrier means and being uniformly spaced from one another in a direction parallel to said conveying direction; each spacer unit including:
      (1) a spacer gate having a working position in which said spacer gate is abutted by an article advanced by the conveyor and an idling position in which articles advanced by the conveyor pass by said spacer gate unhindered thereby;
      (2) a sensor element supported upstream of said spacer gate as viewed in said conveying direction and being displaceable by an article before the article abuts said spacer gate; and
      (3) actuating means operatively coupled to said sensor element and to the spacer gate which forms part of an immediately upstream located spacer unit for moving the last-named spacer gate from the idling position to the working position in response to a displacement of the sensor element by the article.

2. An apparatus as defined in claim 1, wherein each said spacer gate has two parallel transporting faces for guiding the articles on said conveyor and to push the articles at an article transfer station.

3. An apparatus as defined in claim 1, further comprising resetting means for moving each said sensor element into its working position and for moving each said spacer gate into its idling position.

4. An apparatus as defined in claim 1, wherein said carrier means comprises a carrier chain extending parallel to said conveyor and traveling in said conveying direction.

5. An apparatus as defined in claim 1, wherein each said sensor element slopes towards said conveyor in the conveying direction and forms an acute angle therewith.

6. An apparatus as defined in claim 5, wherein said angle is between 5° and 30°.

7. An apparatus as defined in claim 1, wherein each said sensor element has a working position and an idling position; in said working position of the sensor element the respective article advancing in the conveying direction contacts and displaces the sensor element towards the idling position thereof; in the idling position of the sensor element the articles advanced by the conveyor pass by said sensor element without contacting it; each spacer unit further comprising first pivot means pivotally supporting the sensor element for swinging motion in a plane perpendicular to said conveying direction; and a first spring means exerting a first torque on said sensor element for urging said sensor element in the working position thereof; said actuating means including detent means and second spring means for exerting a second torque on said sensor element after an initial displacement thereof by the respective article, said second torque opposing said first torque and being greater than said first torque for moving said sensor element fully into said idling position.

8. An apparatus as defined in claim 7, further comprising a second pivot means supporting said detent means for a pivotal motion in a plane perpendicular to said conveying direction; said detent means including a detent tab including a detent edge and an adjoining camming edge; further comprising a catcher lug and means rigidly affixing said catcher lug to said sensor element; said catcher lug having a catcher edge; said second torque being applied by said second spring means to said sensor element by a camming action between said camming edge and said catcher edge.

9. An apparatus as defined in claim 8, further comprising a propping member and means rigidly affixing said propping member to said detent tab; said propping member and said detent tab having a working position in which said detent edge is supported by said catcher lug against said second torque while said sensor element is in its working position; each said spacer unit further having third pivot means for supporting the spacer gate for pivotal motion in a plane parallel to said conveying direction and third spring means applying a third torque to said spacer gate for urging said spacer gate into its working position; in the working position of said propping member said propping member being in engagement with the spacer gate of said immediately upstream located spacer unit for maintaining the last-named spacer unit in its idling position against said third torque; in the idling position of said propping member and said detent tab said detent edge of said detent tab being clear of said catcher lug and said camming edge of said detent lug being in engagement with said catcher edge and said propping member being clear of the spacer gate of said immediately upstream located spacer unit, whereby said last-named spacer gate is movable into said working position by said third spring means.

10. An apparatus as defined in claim 9, wherein said third pivot means comprises a pivot bar mounted on said carrier means and oriented parallel to said conveyor and perpendicular to said conveying direction; said third pivot means further comprising a carrier member mounted on said pivot bar for pivotal motion in a plane parallel to said conveying direction; said third spring means applying said third torque to said carrier member; said first and said second pivot means being mounted on said carrier member; further comprising cooperating camming means arranged at a predetermined location stationarily along said carrier means and mounted on each said spacer unit for pivoting said propping member and said detent tab about said second pivot means overcoming said second torque and for pivoting said carrier member about said pivot bar overcoming said third torque.

11. An apparatus as defined in claim 10, wherein said cooperating camming comprise
   (a) a first camming rail mounted adjacent said carrier means;
   (b) a setting arm supported for pivotal motion about said second pivot means as a unit with said propping member and said detent tab; said first camming rail being arranged for moving said setting arm about said second pivot means against said second torque;
   (c) a second camming rail mounted adjacent said carrier means; and (d) a follower roller mounted on said carrier member; said second camming rail being arranged for cooperating with said follower roller for pivoting said carrier member about said pivot bar opposite said third torque.

12. An apparatus as defined in claim 11, wherein each said spacer unit further comprises a connecting member having a first end pivotally mounted on said pivot bar and a second end freely supported on the pivot bar of an immediately downstream-located spacer unit, said connecting member having a counter-support bar extending towards said spacer gate for cooperating with said spacer gate to determine the working position thereof.

13. An apparatus for providing a uniform spacing between articles supported on and advanced by a conveyor in a conveying direction, comprising:
  (a) a carrier means arranged for travel in said conveying direction parallel to said conveyor at a speed less than that of said conveyor;
  (b) a plurality of spacer units mounted on said carrier means and being uniformly spaced from one another in a direction parallel to said conveying direction; each spacer unit including:
    (1) a spacer gate having a working position in which said spacer gate is abutted by an article advanced by the conveyor and an idling position in which articles advanced by the conveyor pass by said spacer gate unhindered thereby;
    (2) a sensor element supported upstream of said spacer gate as viewed in said conveying direction and being displaceable by an article before the article abuts said spacer gate; each said sensor element having a working position and an idling position; in said working position of the sensor element the respective article advancing in the conveying direction contacts and displaces the sensor element towards the idling position thereof; in the idling position of the sensor element the articles advanced by the conveyor pass by said sensor element without contacting it;
    (3) first pivot means pivotally supporting the sensor element for swinging motion;
    (4) a first spring means exerting a first torque on said sensor element for urging said sensor element in the working position thereof; and
    (5) actuating means operatively coupled to said sensor element and to the spacer gate which forms part of an immediately upstream located spacer unit for moving the last-named spacer gate from the idling position to the working position in response to a displacement of the sensor element by the article; said actuating means including detent means and second spring means for exerting a second torque on said sensor element after an initial displacement thereof by the respective article, said second torque opposing said first torque and being greater than said first torque for moving said sensor element fully into said idling position.

14. An apparatus as defined in claim 13, wherein said swinging motion of said sensor element is in a plane perpendicular to said conveying direction.

* * * * *